United States Patent [19]

Hayashi et al.

[11] Patent Number: 4,727,768

[45] Date of Patent: Mar. 1, 1988

[54] TRANSMISSION FOR AGRICULTURAL TRACTOR

[75] Inventors: Tetsuaki Hayashi, Osaka; Hiroyuki Ogasawara, Izumi; Nobuyuki Yamashita, Sakai; Fumihiro Ikeda, Osaka; Niro Bando; Kazuaki Kurohara, both of Sakai, all of Japan

[73] Assignee: Kubota, Ltd., Shikitsuhigashi, Japan

[21] Appl. No.: 858,759

[22] Filed: May 2, 1986

[30] Foreign Application Priority Data

| Sep. 2, 1985 | [JP] | Japan | 60-193364 |
| Sep. 2, 1985 | [JP] | Japan | 60-193361 |
| Sep. 3, 1985 | [JP] | Japan | 60-195606 |

[51] Int. Cl.⁴ .......................................... F16H 37/08
[52] U.S. Cl. ........................................ 74/701; 74/342; 74/606 R; 74/740; 192/67 P
[58] Field of Search .............. 74/745, 701, 606 R, 74/342, 344, 369, 371, 740; 192/67 P

[56] References Cited

U.S. PATENT DOCUMENTS

| 1,386,396 | 8/1921 | Cornelison | 74/701 |
| 1,960,637 | 5/1934 | Knudsen | 74/342 X |
| 2,677,967 | 5/1954 | Galbraith | 192/67 P X |
| 2,764,041 | 9/1956 | Walker et al. | 74/745 |
| 2,791,912 | 5/1957 | Bixby | 74/344 |
| 3,099,165 | 7/1963 | Heth et al. | 74/701 X |
| 3,109,326 | 11/1963 | Holtan | 74/701 X |
| 3,159,053 | 12/1964 | Engle | 74/701 |
| 3,365,972 | 1/1968 | Luke et al. | 74/342 |
| 4,028,964 | 6/1977 | Jones | 74/606 R |
| 4,103,566 | 8/1978 | von Kaler et al. | 74/701 |
| 4,224,839 | 9/1980 | von Kaler | 74/745 X |
| 4,420,990 | 12/1983 | Hauser | 74/606 R |
| 4,449,424 | 5/1984 | Hauser | 74/606 R X |
| 4,480,501 | 11/1984 | von Kaler | 74/606 R X |
| 4,553,652 | 11/1985 | Fallos | 192/67 P X |
| 4,611,504 | 9/1986 | Rundle | 74/342 X |

FOREIGN PATENT DOCUMENTS 0208230 8/1959 Fed. Rep. of Germany ........ 74/342

Primary Examiner—Leslie Braun
Assistant Examiner—Dwight G. Diehl
Attorney, Agent, or Firm—Gifford, Groh, VanOphem, Sheridan, Sprinkle and Dolgorukov

[57] ABSTRACT

A transmission for an agricultural working vehicle is provided which includes a gear type forward speed changing mechanism and a wrapping connector backward driving mechanism selectively operable to connect an input shaft and an output shaft. The input shaft carries a plurality of change speed gears and a driving sprocket fixed thereto. The output shaft carries a driven sprocket relatively rotatably mounted thereon and operatively connected to the driving sprocket by a wrapping connector, and a shift gear slidably splined thereto and including gear portions selectively engageable with the change speed gears. The shift gear is linked to the driven sprocket by an engagement mechanism to provide a backward drive state when shift gear assumes a position other than change speed positions.

4 Claims, 6 Drawing Figures

TRANSMISSION FOR AGRICULTURAL TRACTOR

BACKGROUND OF THE INVENTION

The present invention relates to a transmission for an agricultural working vehicle including a gear type forward change speed mechanism and a wrapping connector backward driving mechanism selectively operable to connect an input shaft and an output shaft.

A known transmission of this type comprises a first transmission shaft acting as input shaft and a second transmission shaft acting as output shaft which are operatively connectable through a constant mesh gear forward driving mechanism and a wrapping connector backward driving mechanism disposed close to each other. The second transmission shaft includes a slide key for selectively connecting the second transmission shaft to a group of gears and a wrapping connector mounted on the second transmission shaft to be rotatable relative thereto.

However, since the forward driving mechanism is the constant mesh gear type, the known transmission has the disadvantages of a slight power loss and a high noise level due to the meshing. This transmission also has the inconvenience of requiring a large number of components since, in addition to the gear type forward driving mechanism and the wrapping connector driving mechanism, a shift sleeve must be provided specially for shifting the slide key.

SUMMARY OF THE INVENTION

The object of the present invention is to provide a transmission incorporating a simple modification to eliminate the disadvantages of the prior art.

According to one aspect of the invention, a transmission for an agricultural working vehicle comprises a first and a second transmission shafts rotatably supported in a transmission case, the first transmission shaft being operatively connected to an engine, the second transmission shaft being operatively connected to axles; driving and driven sprockets operatively connected to each other by a wrapping connector, the driving sprocket being fixed to the first transmission shaft, the driven sprocket being relatively rotatably mounted on the second transmission shaft; a plurality of change speed gears fixed to the first transmission shaft; a shift gear splined to the second transmission shaft to be slidable relative thereto and including gear portions selectively engageable with said plurality of change speed gears when assuming change speed positions; and engaging means for placing the shift gear and the driven sprocket in mutual engagement when the shift gear assumes a position other than the change speed positions.

The above construction, which includes the shift gear having gear portions defined on a shift sleeve, involves a reduced number of components compared with the prior art construction requiring, in addition to the gears, a shift sleeve for shifting the slide key. This shift gear is axially slidable to engage with only a selected one of the plurality of gears mounted on the first transmission shaft when the shift gear assumes each change speed position. Therefore, unlike the conventional constant mesh type gear mechanism, the mechanism including the shift gear involves little power loss and low noise level. Furthermore, the shift gear is slidable away from the forward drive change speed positions to be rigidly connected to the driven rotary wheel or sprocket through the engaging means thereby to establish a backward drive state.

BRIEF DESCRIPTION OF THE DRAWINGS

The above and other objects and features of the present invention will become apparent from the following description taken in conjunction with the preferred embodiments thereof with reference to the accompanying drawings, in which.

DESCRIPTION OF THE PREFERRED EMBODIMENTS

A lawn tractor embodying the present invention will be described hereinafter.

Figure 1:
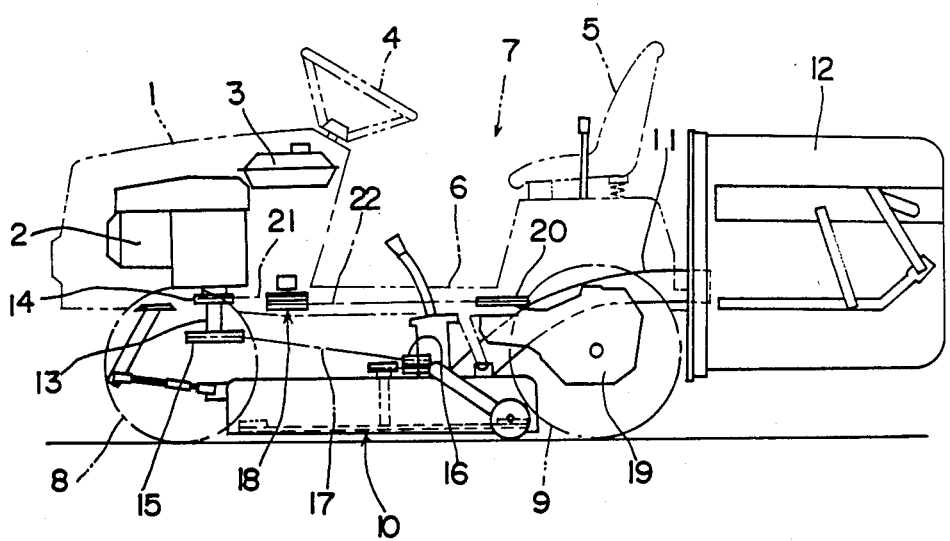
FIG. 1 is a side elevation of a lawn tractor embodying the invention.

Referring to FIG. 1, the lawn tractor shown therein comprises a hood 1 provided at a front of the vehicle body and enclosing an engine 2 and a fuel tank 3, and a driver's section 7 provided at a rear portion of the vehicle body and including a steering wheel 4, a driver's seat 5 and right and left flat decks 6, with the vehicle body supported by front and rear wheels 8, 9. The tractor further comprises a cutting unit 10 mounted between the front wheels 8 and the rear wheels 9, a discharge duct 11 extending rearwardly from the cutting unit 10 and through a space between the right and left rear wheels 9, and a grass catcher 12.

The tractor has a drive transmission including a downwardly extending ouput shaft 13 of the engine 2 and an upper and a lower output pulleys 14 and 15 mounted on the output shaft 13. The transmission includes a sidewise wrapping connector driving mechanism having a belt 17 interconnecting the lower pulley 15 and an input pulley 16 mounted on an input shaft of the cutting unit 10. The part of the transmission related to the propelling system of the tractor includes an input pulley 20 of a transmission case 19 connected by means of belts 21 and 22 to the upper output pulley 14 through a stepless change speed device 18 for driving the rear wheels 9 journaled at a bottom of the transmission case 19.

Figure 2:
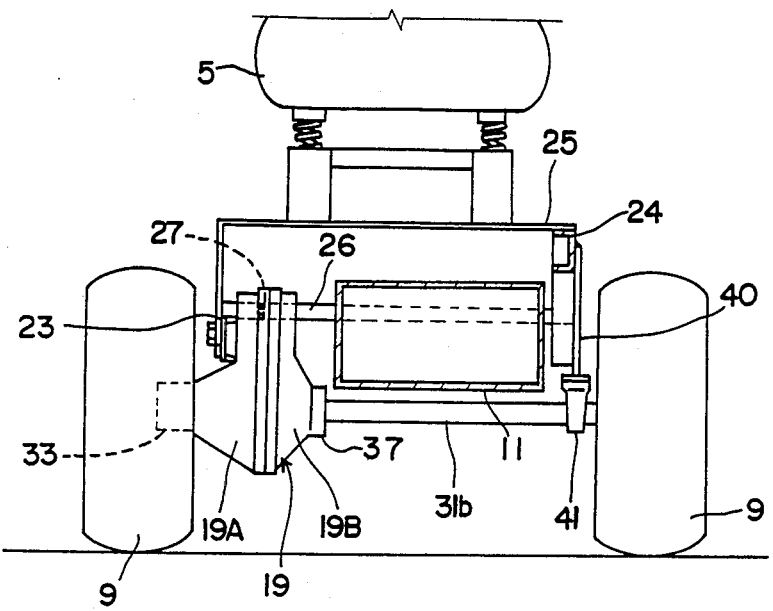
FIG. 2 is a rear view of the lawn tractor showing how a transmission case is mounted.
Figure 3:
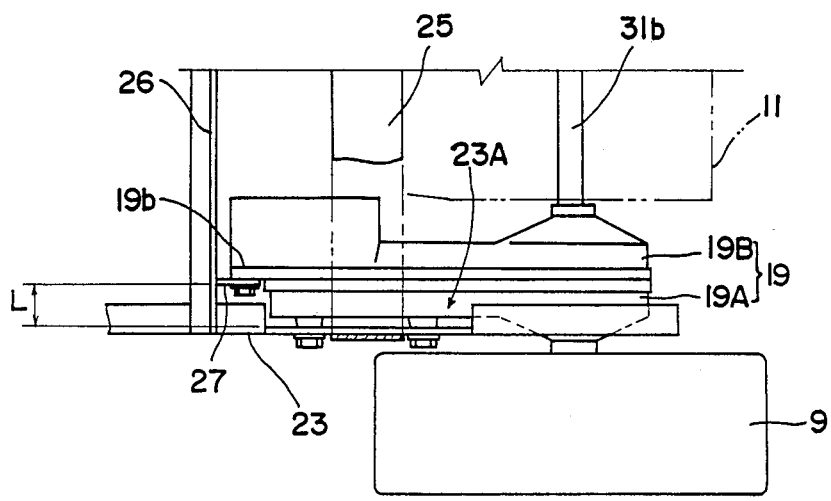
FIG. 3 is a plan view showing how the transmission is mounted.

As shown in FIGS. 2 and 3, the tractor includes left and right main frames 23 and 24 extending longitudinally thereof, the right frame 24 being at a higher level than the left frame 23. The two main frames 23 and 24 are rigidly interconnected by a support frame 25 of the driver's seat 5. The tranmission case 19 is offset from a longitudinal center line of the tractor to a position adjacent the left main frame 23. The main frame 23 which has a channel-shaped section defines cutouts 23A in flange portions thereof to suit the shape of the transmission case 19. The transmission case 19 has a lateral face securely fixed to a web portion of the channel section. The transmission case 19 comprises a left case portion 19A fixed to the main frame 23 and a right case portion 19B having a flange surface 19b attached to a plate-like bracket 27 extending from an angle-shaped connecting frame 26 extending between the two main frames 23 and 24 forwardly of the transmission case 19.

As shown in FIG. 3, the positions at which the transmission case 19 is attached to the main frame 23 and the connecting frame 26 are spaced apart by a distance L. This is effective to lighten a load falling on metal fittings used for the attachement, to allow the transmission case 19 to be supported in a stable manner.

Since the right case portion 19B is attached to the plate-like bracket 27 simply through its flange surface 19b, the right case portion 19B need not be provided with a seat specially for the attachment purpose. The flange surface 19b may be attached to the plate-like bracket 27 from either a left side or a right side.

Figure 4:
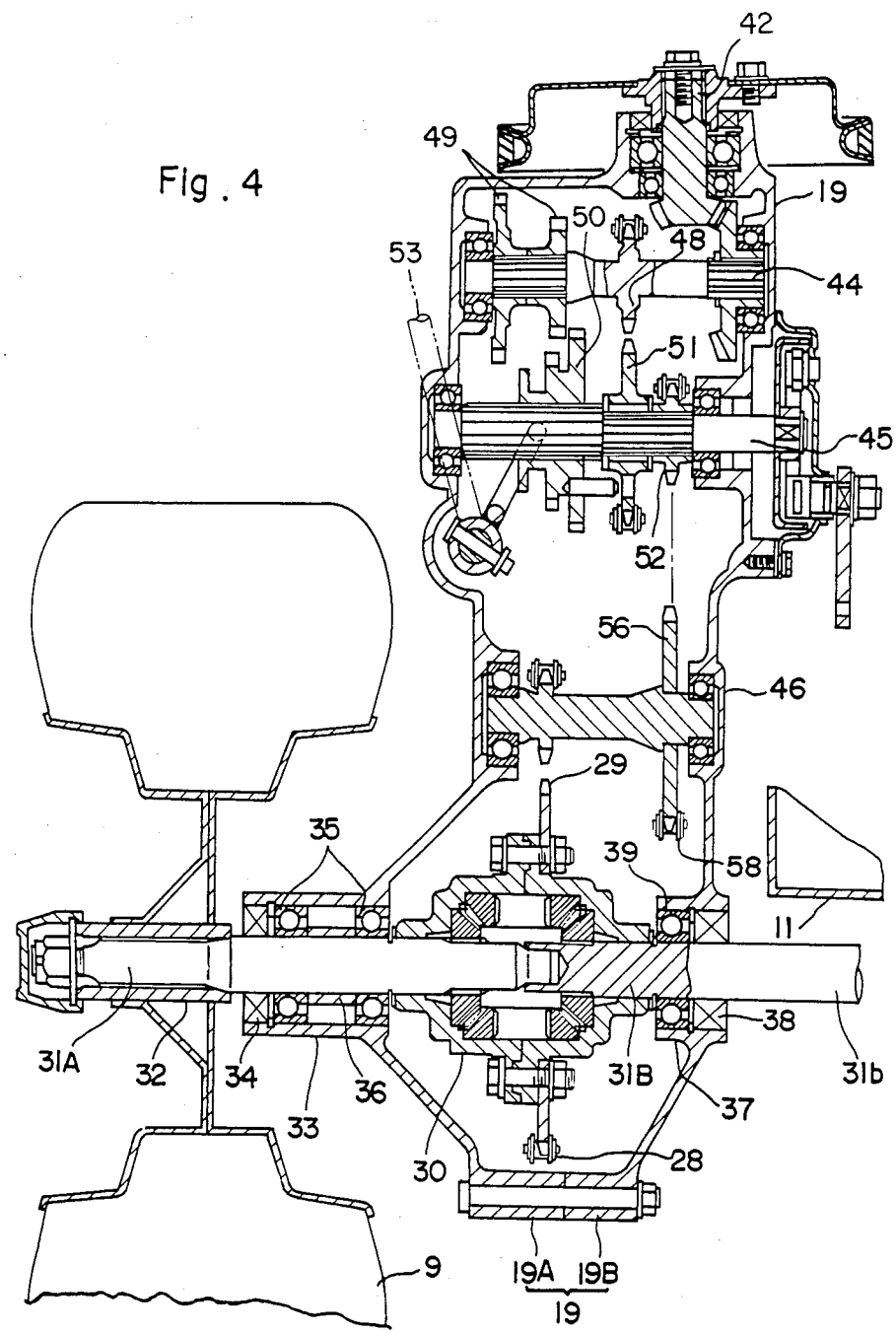
FIG. 4 is a rear view in vertical section showing an axle support structure of the transmission case.

Next, an axle support structure of the transmission case 19 with respect to the rear wheels 9 will be described. As shown in FIG. 4, a differential case 30 includes a sprocket 29 rigidly attached thereto which is driven by a chain 28 extending from an input side. Rotatable rear axles 31A and 31B extend transversely from the differential case 30 and carry rear wheel bosses 32 at opposite ends thereof which permit variations of the tread. The left case portion of the transmission case 19 attached to the main frame 23 includes a projecting pivotal tubular portion 33 containing an oil seal 34, two bearings 35 and a spacer 36 fitted between the bearings 35. A pivotal portion 37 for the rear axle 31B is provided opposite the pivotal portion 33, which contains an oil seal 38 and a bearing 39. The pivotal portion 37 needs to project only a small amount since only one bearing is disposed therein.

As shown in FIG. 2, the discharge duct 11 is disposed laterally of the projecting pivotal portion 37 of the transmission case 19 containing the single bearing. A vertical bracket 40 extends downwardly from the main frame 24 disposed laterally outwardly of the discharge duct 11. The veritcal bracket 40 carries a pillow block type support 41 to support a projecting portion 31b of the rear axle 31B projecting from the pivotal portion 37.

The support 41 may be a type other than the pillow block but should desirably be a type having an automatic aligning function.

Figure 6:
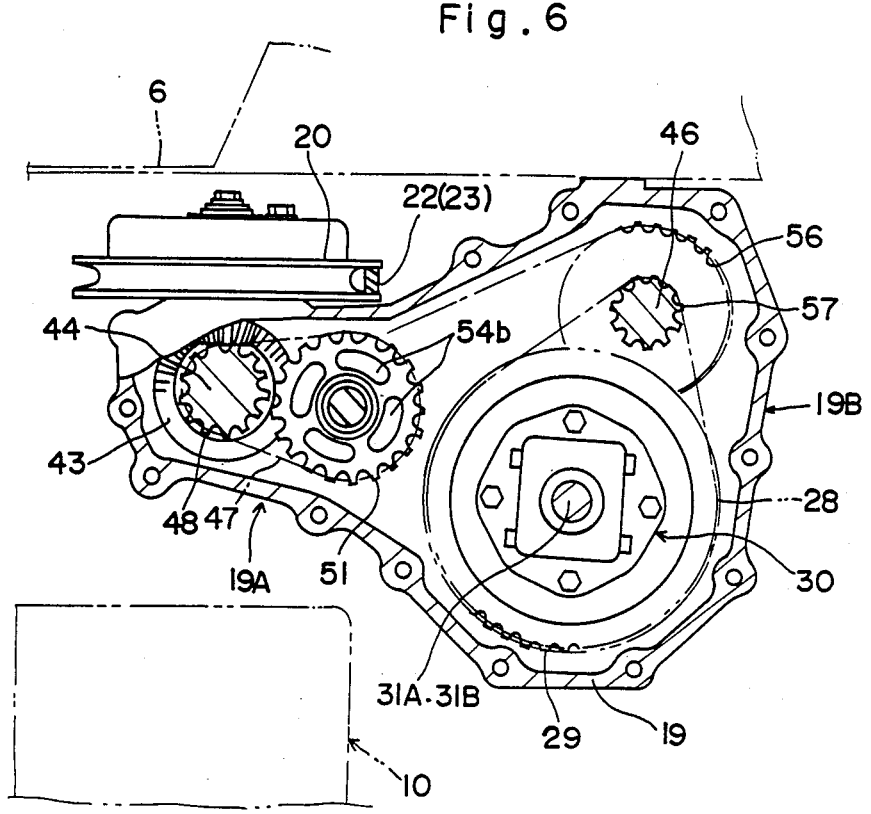
FIG. 6 is a side view in vertical section of the transmission structure.
Figure 5:
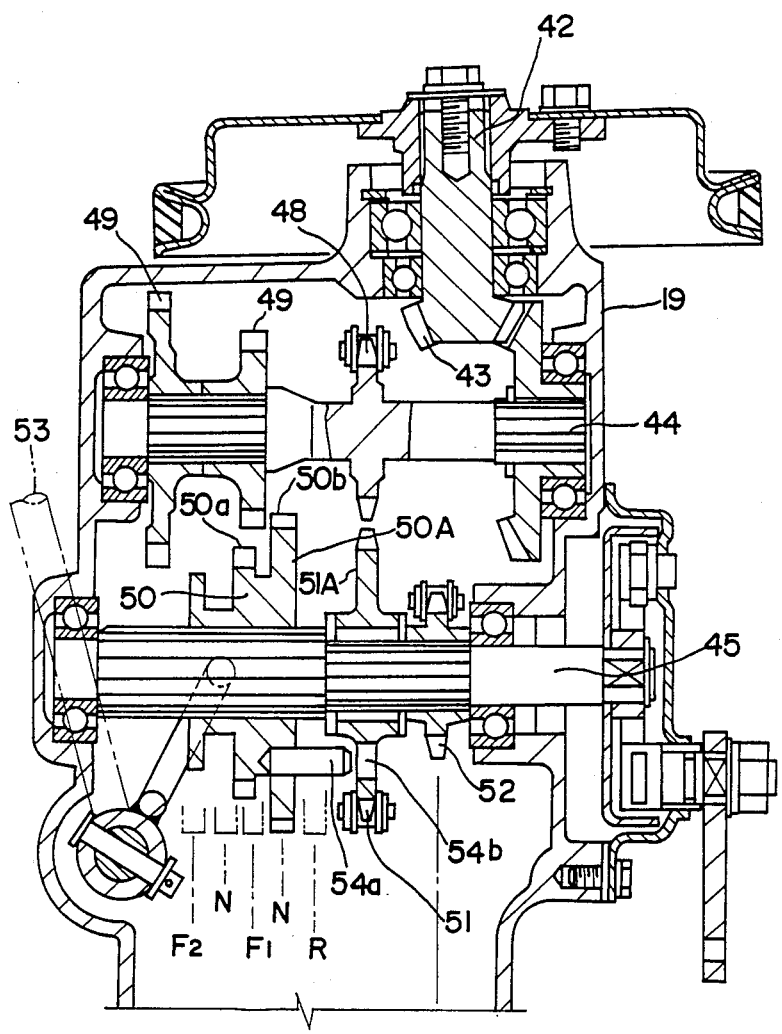
FIG. 5 is an enlarged rear view of a principal portion of a transmission structure.

Details of the transmission case 19 will now be described with reference to FIGS. 5 and 6. The transmission case 19 supports at a top wall thereof an input pulley shaft 42 carrying an input pulley 20 which is one of rotary transmission members. The transmission case 19 further supports a first transmission shaft 44 extending transversely and driven by the input pulley shaft 42 through bevel gears 43, a second transmission shaft 45 extending transversely and disposed rearwardly of the first transmission shaft 44, a third transmission shaft 46 extending transversely and disposed rearwardly and upwardly of the second transmission shaft 45, and the rear axles 31A, 31B disposed below the third transmission shaft 46.

The first transmission shaft 44 carries a sprocket 48 formed integral therewith and a large and small two step gearing 49 splined thereto to act as driving rotary wheels. The second transmission shaft 45 carries a shift gear 50 splined thereto for axial sliding movements to act also as a clutch sleeve and including gear portions 50a and 50b selectively engageable with the large and small two step gearing 49. The second transmission shaft 45 further carries a sprocket 51 rotatable relative thereto to act as a driven rotary wheel, and a driving sprocket 52 splined thereto. The power is transmitted from the sprocket 48 to the sprocket 51 through a chain 47. The shift gear 50 is slidable by operating a shift lever 53 to selectively engage the large and small two step gearing 49 thereby providing a high forward speed F2, neutral N, a low forward speed F1, neutral N, and a backward drive R. The backward drive is established through a chain driving mechanism and by engagement between an engaging pin 54a provided as one of engaging means 54 projecting from a side face 50A of the shift gear 50 toward a side face 51A of the driven sprocket 51 and engaging bores 54b defined as the other engaging means 54 at a plurality of positions peripherally of the driven sprocket 51. Each of the engaging bores 54b is in the form of an elongate opening extending peripherally of the driven sprocket 51 to be smoothly engageable by the pin 54a. The drive output by the above change speed construction is transmitted to the driving sprocket 52 and through a chain 58 to a large driven sprocket 56 formed integral with the third transmission shaft 46. The drive is then transmitted from a small driving sprocket 57 formed integral with the third transmission shaft 46 through a chain 28 and the input sprocket 29 fixed to the differential case 29 to the rear axles 31A, 31B supporting the rear wheels 9 at the opposite lateral ends thereof.

The wrapping connector drive mechanism for the backward drive may employ timing belts instead of the chains.

As described, the first transmission shaft 44 and the second transmission shaft 45 are arranged to extend horizontally which are contained inside a front portion of the transmission case 19, and the third transmission shaft 46 and the rear axles 31A, 31B are arranged one above the other which are contained inside a rear portion of the transmission case 19. This construction, along with a small torque transmission, permits the front portion of the transmission case 19 to have a smaller vertical dimension than the rear portion of the transmission case 19 and to be disposed at a lower level than the top of the rear portion. This permits deck surfaces to be at a low level while assuring a sufficient space for accommodating the cutting unit 10. Further, since the shafts in the transmission case 19 are arranged close to one another, the input portion extends only a small amount into the cutting unit accommodating space, whereby the wheelbase need not be enlarged to accommodate the cutting unit 10.

What is claimed is:

1. A transmission for an agricultural working vehicle comprising:
   first and second transmission shafts rotatably supported in a transmission case, the first transmission shaft being operatively connected to an engine, the second transmission shaft being operatively connected to axles,
   driving and driven sprockets operatively connected to each other by a wrapping connector, the driving sprocket being fixed to the first transmission shaft, the driven sprocket being relatively rotatably mounted on the second transmission shaft,
   a plurality of change speed gears fixed to the first transmission shaft,
   a shift gear splined to the second transmission shaft to be slidable relative thereto and including gear portions selectively engageable with said plurality of change speed gears when assuming change speed positions, and engaging means for placing the shift gear and the driven sprocket in mutual engagement when the shift gear assumes a position other than the change speed positions;

wherein the first transmission shaft is transversely supported at a front portion of the transmission case, the second transmission shaft being transversely supported rearwardly of the first transmission shaft, a third transmission shaft and the rear axles being transversely supported rearwardly of the second transmission shaft and one above the other, and wherein the second transmission shaft and the third transmission shaft are operatively connected to each other by a wrapping connector so as to effect reduction, the third transmission shaft and the axles being operatively connected to each other by a wrapping connector so as to effect reduction, and wherein the front portion of the transmission case has a smaller veritcal dimension than a rear portion thereof and is disposed at a lower level than a top of the rear portion, and wherein the first and second transmission shafts are supported in the front portion, the third transmission shaft and the axles being supported in the rear portion, and wherein a driving rotary member of a sidewise wrapping connector driving mechanism for operatively connecting the first transmission shaft to the engine is disposed above the front portion of the transmission case.

2. A transmission as claimed in claim 1 wherein the engaging means includes a pin projecting from a side face of the shift gear toward the driven sprocket, and engaging bore means defined in the driven sprocket to engage with the pin.

3. A transmission as claimed in claim 2 wherein the engaging bore means comprises a plurality of engaging bores defined peripherally of the driven sprocket and one apart from another.

4. A transmission as claimed in claim 3 wherein each of the engaging bores is in form of an opening elongated peripherally of the driven sprocket.

* * * * *